United States Patent [19]
Duffer et al.

[11] Patent Number: 4,606,946
[45] Date of Patent: * Aug. 19, 1986

[54] METHOD OF APPLYING INTERLEAVING MATERIAL TO GLASS SHEETS

[75] Inventors: Paul F. Duffer, Creighton; Joseph D. Kelly, Cheswick; Helmut Franz, Pittsburgh, all of Pa.

[73] Assignee: PPG Industries, Inc., Pittsburgh, Pa.

[ * ] Notice: The portion of the term of this patent subsequent to Jul. 16, 2002 has been disclaimed.

[21] Appl. No.: 754,510

[22] Filed: Jul. 12, 1985

Related U.S. Application Data

[63] Continuation-in-part of Ser. No. 229,220, Jan. 28, 1981, Pat. No. 4,529,648.

[51] Int. Cl.$^4$ .................. B05D 3/02; B32B 15/00; B32B 17/08; B32B 23/00

[52] U.S. Cl. ................... 427/384; 65/24; 252/11; 428/326; 428/432; 428/438

[58] Field of Search .............. 65/24; 252/11; 427/384; 428/326, 432, 438

[56] References Cited

U.S. PATENT DOCUMENTS

| | | | |
|---|---|---|---|
| 3,723,312 | 3/1973 | Hay | 252/11 |
| 4,011,359 | 3/1977 | Simpkin et al. | 428/326 |
| 4,200,670 | 4/1980 | Albach | 427/154 |
| 4,263,371 | 4/1981 | Franz | 428/432 |

*Primary Examiner*—Michael R. Lusignan
*Attorney, Agent, or Firm*—Donna L. Seidel; Donna L. Seidel

[57] ABSTRACT

A method is disclosed for applying a powdered interleaving material to a glass surface in the form of an aqueous composition comprising particulate interleaving material dispersed in atomized water.

10 Claims, No Drawings

METHOD OF APPLYING INTERLEAVING MATERIAL TO GLASS SHEETS

CROSS-REFERENCE TO RELATED APPLICATION

This application is a continuation-in-part of U.S. application Ser. No. 229,220 filed Jan. 28, 1981 by the same inventors, now U.S. Pat. No. 4,529,648, patented July 16, 1985.

BACKGROUND

The present invention relates generally to the art of separating glass sheets and relates more particularly to the art of applying powdered interleaving materials.

It is well-known in the art that stacked glass sheets may be protected from surface damage by the use of various interleaving material such as paper or powdered materials such as wood flour, polyethylene, polystyrene or polyacrylates. Powdered materials are preferably finely divided, fairly uniform in size distribution, and free-flowing so that they may be applied by means of conventional, commercially available equipment.

U.S. Pat. No. 3,723,312 to Hay discloses using a dedusted agglomerated salicylic acid, mixed with an inert separator material such as polystyrene beads. This particulate interleaving material may be applied to glass by mechanical dusters or other particulate application equipment known to those skilled in the art of dusting glass with wood flour or other inert particulate interleaving materials.

U.S. Pat. No. 4,200,670 to Albach describes a method of treating glass sheets to be stacked by applying water, a stain inhibiting material such as ammonium chloride, and dry particles of a mechanical separator such as wood flour, to such sheets in a plurality of sequential steps. According to one specific embodiment, the water and stain inhibitor are first applied to the glass as an aqueous solution of the latter to provide a wet layer on the sheet surface, and then a dry particulate layer of a mechanical separator is separately applied to the wet layer. The method can also be carried out by first spraying the glass surface with water alone, and then separately applying layers of a stain inhibitor and a mechanical separator in dry powdered form to the layer of water; or by first applying a layer of a mixture of dry powdered stain inhibitor and mechanical separator and then spraying this layer of dry material with water.

SUMMARY OF THE INVENTION

The present invention involves the application of powdered interleaving material to a glass surface in the form of an aqueous composition. In accordance with the present invention, powdered interleaving materials, particularly polymeric beads, are combined with atomized water en route to the glass substrate to form an aqueous slurry composition which is then applied to the glass surface. Upon drying, a uniform distribution of interleaving material is obtained on the glass surface. Although the slurry-applied powdered interleaving is sufficiently adherent to the glass to withstand handling and transporting, it is easily removed by washing prior to further processing operations such as coating or laminating, with no adverse effects on such subsequent processing operations.

DESCRIPTION OF THE PREFERRED EMBODIMENTS

Glass sheets are treated with an aqueous composition of a powdered interleaving material in accordance with the present invention. The powdered interleaving material may be any finely divided support material such as wood flour, rice flour, vermiculite, polyethylene, polystyrene, polymethylmethacrylate, etc., but is preferably Lucite ® acrylic resin beads from DuPont.

In a preferred embodiment of the present invention, a quantity of about 0.5 to 10 grams, preferably about 1 to 3 grams, of particulate interleaving material is dispersed per 100 milliliters of atomized water. The slurry may be dried at elevated temperatures, but preferably is allowed to dry at ambient temperature. Upon drying, the glass surface is uniformly covered with the interleaving material. Adherence of the interleaving material is sufficient to withstand handling and transporting; however, the material may be easily removed by conventional washing operations prior to further processing steps such as coating or laminating.

In a most preferred embodiment of the present invention, the interleaving material is impregnated with a strongly acidic organic compound as disclosed in U.S. Pat. No. 4,530,889, entitled "Acidified Powdered Interleaving", the disclosure of which is incorporated herein by reference. In an alternate preferred embodiment of the present invention, the aqueous composition comprises a particulate material such as polymethylmethacrylate beads dispersed in an aqueous solution of a strongly acidic organic compound. In these embodiments, the strongly acidic organic compound is characterized as being water soluble, solid at ambient temperatures, and having a pH less than about 3 when dissolved in water at a concentration of about 1 percent. Organic acids such as adipic, succinic, citric, malic or tartaric acid are preferred if the treated glass is to be tempered without washing, since these acids will completely burn off, leaving no residue on the surface of the tempered glass sheet.

Preferably, powder interleaving material is dispersed at a rate of about 25 to 150 grams per hour into atomized water dispersed at 500 psi and a rate of about 5 to 10 liters per hour per powder applicator. The application rates may vary beyond these ranges at other pressures and different line speeds.

The present invention will be further understood from the descriptions of specific examples which follow.

EXAMPLE I

An aqueous composition is formed by dispersing Lucite ® acrylic resin beads at a rate of 70 grams per hour into atomized water dispensed at 500 psi and a rate of 7 liters per hour above the glass surface. The aqueous interleaving powder composition settles by gravity onto the glass and is allowed to dry at ambient temperatures. The volume of slurry is such that the coverage rate is about 4,000 to 10,000 square feet of glass per pound of Lucite ® beads. A uniform distribution of interleaving material on the glass surface is obtained. To test the adherence of the particulate interleaving material to the glass surface, treated glass substrates are dropped vertically from a height of 5 inches onto a felt pad. About 95 percent by weight of the interleaving material remains on the glass surface. The interleaving material is sufficiently adherent to remain on the glass throughout handling and transportation, but is easily removed by conventional washing techniques prior to subsequent processing such as coating or laminating.

EXAMPLE II

An aqueous composition is formed by dispersing 70 grams per hour of polymethylmethacrylate beads into atomized water dispensed at a rate of 7 liters per hour above the glass substrate. The atomized water comprises 2 percent by weight of acid stain inhibitor which is a 50/50 by weight mixture of malic and adipic acids. The aqueous interleaving composition settles by gravity onto the glass surface and dries at ambient temperatures leaving a uniform layer of interleaving material on the glass surface. Treated glass sheets are dropped as in the previous example. About 95 percent by weight of the interleaving material remains on the glass surface.

EXAMPLE III

An aqueous composition is prepared by dispersing a 50/50 by weight mixture of Lucite ® beads and adipic acid in water, and is applied as in the previous Examples. About 95 percent by weight of the interleaving material remains on the glass surface when the treated substrate is dropped vertically from a height of 5 inches.

The above examples are offered to illustrate the present invention. Various modifications, such as the use of other powdered interleaving materials, with or without stain inhibiting materials, other acids, and various concentrations and application temperatures, are included within the scope of the invention, which is defined by the following claims.

We claim:

1. A method for applying a powdered interleaving material to a glass surface comprising the steps of:
    a. dispersing a powdered interleaving material in atomized water;
    b. applying said aqueous composition of said powdered interleaving material to a glass surface; and
    c. drying said aqueous composition to obtain a uniform adherent layer of interleaving material on said glass surface.
2. The method according to claim 1, wherein said powdered interleaving material comprises acrylic resin beads.
3. The method according to claim 2, wherein said interleaving material is dispersed in water at a concentration of about 0.5 to 10 grams per 100 milliliters.
4. The method according to claim 1, wherein said aqueous composition further comprises a stain inhibitor.
5. The method according to claim 4, wherein the stain inhibitor is a strongly acidic organic compound.
6. The method according to claim 5, wherein the stain inhibitor is selected from the group consisting of adipic, succinic, malic, citric, glutaric and tartaric acids and mixtures thereof.
7. The method according to claim 5, wherein the stain inhibitor is a hydroxy carboxylic acid.
8. The method according to claim 7, wherein the stain inhibitor is selected from the group consisting of citric, malic and tartaric acids and mixtures thereof.
9. The method according to claim 1, wherein the stain inhibitor is mixed in dry form with the interleaving material.
10. The method according to claim 1, wherein the stain inhibitor is added to the water prior to dispersing the interleaving material in the water.

* * * * *